United States Patent [19]

Klein et al.

[11] Patent Number: 4,819,148
[45] Date of Patent: Apr. 4, 1989

[54] DIGITAL GATE PULSE GENERATOR FOR CYCLOCONVERTER CONTROL

[75] Inventors: Frederick F. Klein, Monroeville; Gioacchino A. Mutone, Pleasant Hills, both of Pa.

[73] Assignee: The United States of America as represented by the United States Department of Energy, Washington, D.C.

[21] Appl. No.: 116,187

[22] Filed: Nov. 3, 1987

[51] Int. Cl.$^4$ .................................... H02M 5/257
[52] U.S. Cl. ............................ 363/161; 363/159
[58] Field of Search .................... 363/159–161, 363/163

[56] References Cited

U.S. PATENT DOCUMENTS

| 3,585,485 | 6/1971 | Gyugyi | 321/7 |
|---|---|---|---|
| 3,858,105 | 12/1974 | Gyugyi | 321/27 R |
| 3,982,167 | 9/1976 | Espelage | 321/61 |
| 4,017,744 | 4/1977 | Johnson | 307/252 |
| 4,225,911 | 9/1980 | Carlson | 363/50 |
| 4,307,444 | 12/1981 | Stacey et al. | 363/161 |
| 4,349,867 | 9/1982 | Otsuka et al. | 363/160 |
| 4,356,542 | 10/1982 | Bruckner et al. | 363/26 |
| 4,385,242 | 5/1983 | Wagener | 363/160 X |
| 4,390,938 | 6/1983 | Stacey | 363/160 X |
| 4,538,220 | 8/1985 | Gyugyi | 363/161 |

OTHER PUBLICATIONS

Park et al., "Microprocessor-Controlled Cycloconverter," Proceedings of the 1979 International Symposium on Circuits and Systems, Tokyo, Japan (Jul. 1979) at pp. 924–1943.

Tso et al., "Efficient Microprocessor-based Cycloconverter Control," IEEE Proceedings, vol. 127, Pt. B, No. 3 (May 1980) at pp. 190–196.

Singh et al., "Microprocessor-Controlled Single-Phase Cycloconverter," IEEE Transactions on Industrial Electronics and Control Instrumentation, vol. IECE-25, No. 3 (Aug. 1978) at pp. 233–238.

Primary Examiner—William M. Shoop, Jr.
Assistant Examiner—Marc S. Hoff

[57] ABSTRACT

The present invention provides a digital gate pulse generator which controls the output of a cycloconverter used for electrical power conversion applications by determining the timing and delivery of the firing pulses to the switching devices in the cycloconverter. Previous gate pulse generators have been built with largely analog or discrete digital circuitry which require many precision components and periodic adjustment. The gate pulse generator of the present invention utilizes digital techniques and a predetermined series of values to develop the necessary timing signals for firing the switching device. Each timing signal is compared with a reference signal to determine the exact firing time. The present invention is significantly more compact than previous gate pulse generators, responds quickly to changes in the output demand and requires only one precision component and no adjustments.

13 Claims, 5 Drawing Sheets

DIGITAL GATE PULSE GENERATOR FOR CYCLOCONVERTER CONTROL

FIELD OF THE INVENTION

The present invention relates to a pulse generator for controlling the firing of the switching devices in a cycloconverter used with a variable speed generator.

BACKGROUND OF THE INVENTION

As shown in FIG. 1, a cycloconverter is a device which is used to convert three phase input power at line voltage and frequency to three phase output power at a different, controlled voltage and frequency. Typically, a cycloconverter is used to convert the line voltage waveforms to those desired to be applied to the rotor of a variable speed generator so that the output from the generator matches the line voltage waveforms. A common 6 pulse cycloconverter design typically includes six bridge circuits, two for each phase. Each bridge circuit typically contains six switching devices. There are other implementations of a cycloconverter such as a 12 pulse design which used twice as many switching devices as the 6 pulse design, however, the underlying operating principles are the same.

The output of the cycloconverter is controlled by adjusting the timing of the firing pulses for each of the switching devices. The maximum output of the cycloconverter is obtained if each switching device is fired at a time called the "natural commutation time," i.e., the time at which the switching device would begin to conduct if it were an ideal diode. If the firing time of the switching devices is delayed, the output of the cycloconverter is modified by the cosine of the phase delay.

Modulation of the time delay can be used to form any desired output waveshape. The appropriate modulation results in the desired output waveform being applied to the rotor. The firing times of the switching devices in a cycloconverter are typically controlled by a gate pulse generator. A gate pulse generator generates timing waveforms and compares these to a set of three reference voltages (one for each phase) and fires the appropriate switching devices when these signals are equal.

Analog gate pulse generators have been developed and used for this purpose; however, they have several significant disadvantages. These disadvantages include the use of a large number of analog circuits. A typical analog gate pulse generator can require a large amount of control circuitry consisting of four "Multibus" boards and an auxiliary input panel. It also requires extensive additional control circuitry to implement certain desired functions such as "end stop" and "output pulse shaping."

Analog gate pulse generators also require numerous precision components to provide the desired operating accuracy. These components also require periodic adjustment and are subject to degradation in performance due to component drift from aging or changes in temperature.

An analog gate pulse generator also requires three line voltage inputs for each phase of the output voltage (a total of nine inputs) and two differential voltage inputs for each phase of the output voltage (a total of six outputs). A significant amount of the total wiring of the generator control system is devoted to developing these voltage inputs. It is also believed that a significant amount of the undesirable noise on the output of a variable speed generator at slip frequency is due to inaccuracy in the analog gate pulse generator.

Previously known digital gate pulse generators for controlling cycloconverters are disclosed in U.S. Pat. No. 4,017,744; Park et al, "Microprocessor—Controlled Cycloconverter," *Proceedings of the* 1979 *International Symposium on Circuits and Systems,* Tokyo, Japan, July 1979, pp. 942–43; Tso et al, "Efficient Microprocessor-based Cycloconverter Control," *IEEE Proceedings,* Vol. 127, Pt. B, No. 3, May 1980, pp. 190–96; and Singh et al, "Microcomputer-Controlled Single-phase Cycloconverter," *IEEE Transactions On Industrial Electrics and Control Instruments,* Vol. IECI-25, No. 3, August 1978, pp. 233–38. The devices in these references, however, do not respond fast enough to changes in the output demand.

Other cycloconverter control systems are disclosed in U.S. Pat. Nos. 3,585,485; 3,858,105; 3,982,167; 4,225,911; 4,349,867 and 4,356,542.

SUMMARY OF THE INVENTION

The digital gate pulse generator of the present invention overcomes a number of the above described difficulties and disadvantages of the prior art. The present invention comprises a digitally based gate pulse generator which develops a series of timing signals, compares the timing signals to a reference signal and fires the appropriate switching device when the timing signal corresponds to the reference signal (e.g., the values of the timing and reference signals are the same). The comparison of the timing signals with the reference signal is made at the time the decision to fire the appropriate switching device is made. This enables the present invention to respond very quickly to changes in the reference signal.

The gate pulse generator is comprised of a plurality of gate pulse controllers, preferably six, one for each bridge circuit in the cycloconverter and an interface circuit means for coordinating the operation of the plurality of controllers. A calculating means of the digital gate pulse controller generates the timing signals from a predetermined series of reference values. These reference values are preferably converted to an analog signal by a digital-to-analog converter ("D/A converter") and then compared to the reference signal which represents the desired output waveform for that phase. The result of this comparison is monitored by the calculating means and the appropriate action is taken to have a firing means fire the appropriate switching device when the timing and reference signals correspond.

A timing pulse is preferably derived from one phase of the input voltages. This phase is passed through a phase circuit means to develop the timing pulse. The timing pulse is used to generate the sequential timing signals. The phase circuit means preferably comprises a filter and a second comparator which detects the zero crossing of the input voltage.

The timing pulse causes the calculating means to read the value of a counter which has counted the number of clock pulses since the last timing pulse and then resets the counter. Since the timing signals are at the same frequency as the input voltage phase, a fixed fraction of the count in the counter will be a fixed phase increment of this input voltage. This fixed fraction developed from the counter is used to generate the appropriate timing signal waveforms by stepping through a predetermined series of values, preferably cosine values, stored in memory.

The appropriate values for each timing signal are selected from the predetermined series of values depending upon the current number of counts within the counter and the fixed phase shift which depends upon the next switching device to be fired. This value is preferably output to the D/A converter. The output value of the D/A converter is compared to the reference signal for that phase by a comparator. The output of the comparator is read by the calculating means. If a correspondence is detected (e.g., the timing signal crosses the reference signal), the calculating means outputs a firing signal to a firing means to fire the appropriate switching device.

In addition to detecting when the reference signal and the timing signals correspond, the calculating means must ensure that certain limits such as the Rectification End Stop and the Inversion End Stop are not exceeded. These limits, respectively, prohibit the firing of a switching device before a specified time, and require that a switching device be fired no later than a specified time.

Other details, objects and advantages of the present invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
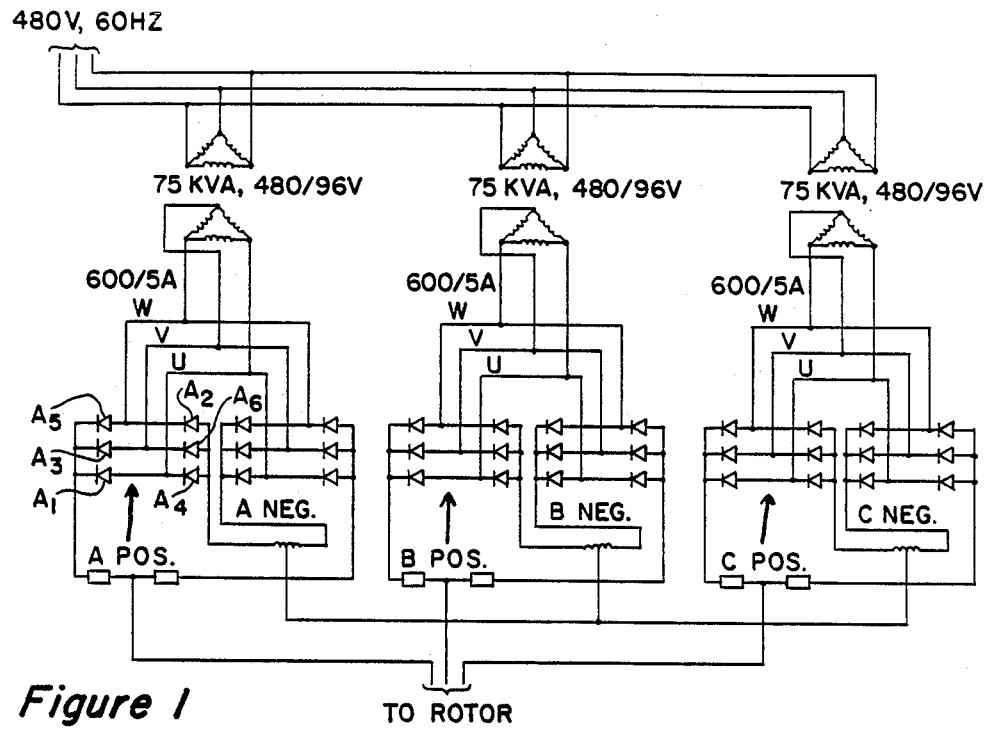
FIG. 1 is a simplified schematic diagram of a typical cycloconverter.
Figure 2:
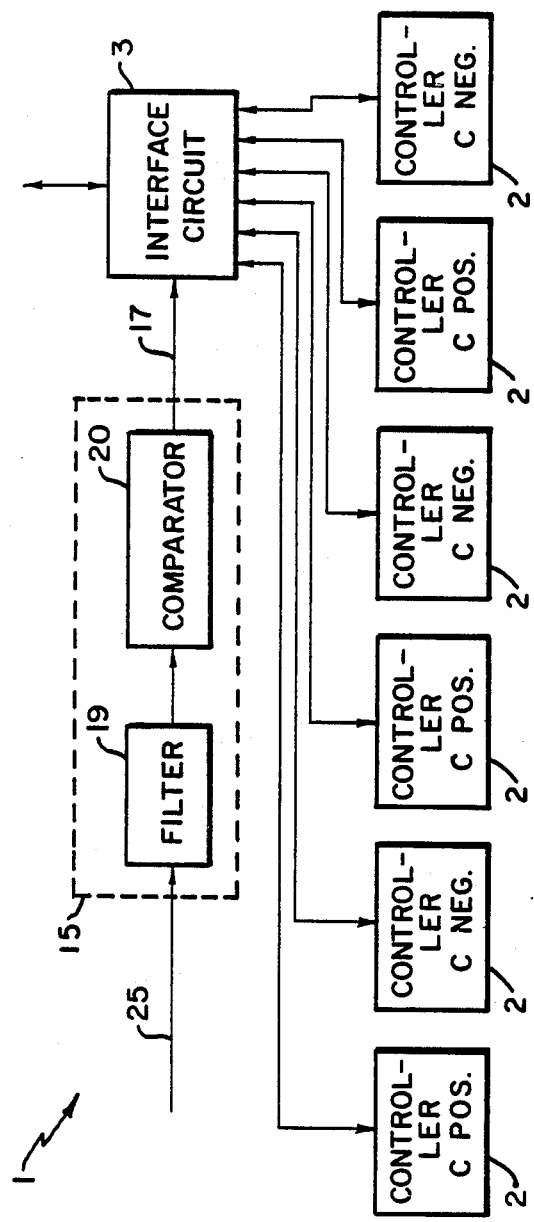
FIG. 2 is a block diagram of a digital gate pulse generator for controlling a cycloconverter.

Generally, the present invention provides a digital gate pulse generator used to control the switching devices in a cycloconverter such as the one shown in FIG. 1. As shown in FIG. 2, gate pulse generator 1 has a plurality of gate pulse controllers 2 which compare internally generated timing signals with a reference signal (one for each phase) to determine when the signals correspond so that the appropriate switching device can be fired. Preferably the switching devices are solid state devices such as silicon controlled rectifiers or thyristors.

In the cycloconverter shown in FIG. 1, there are two bridge circuits, a positive and a negative bridge, for each of the three phases of the output voltage. The direction of the output current demanded by the load (the rotor in FIG. 1) determines which bridge circuit actually conducts. Each bridge circuit consists of six solid state switching devices, two connected to each phase of the input line voltage and all connected to the load.

Figure 3:
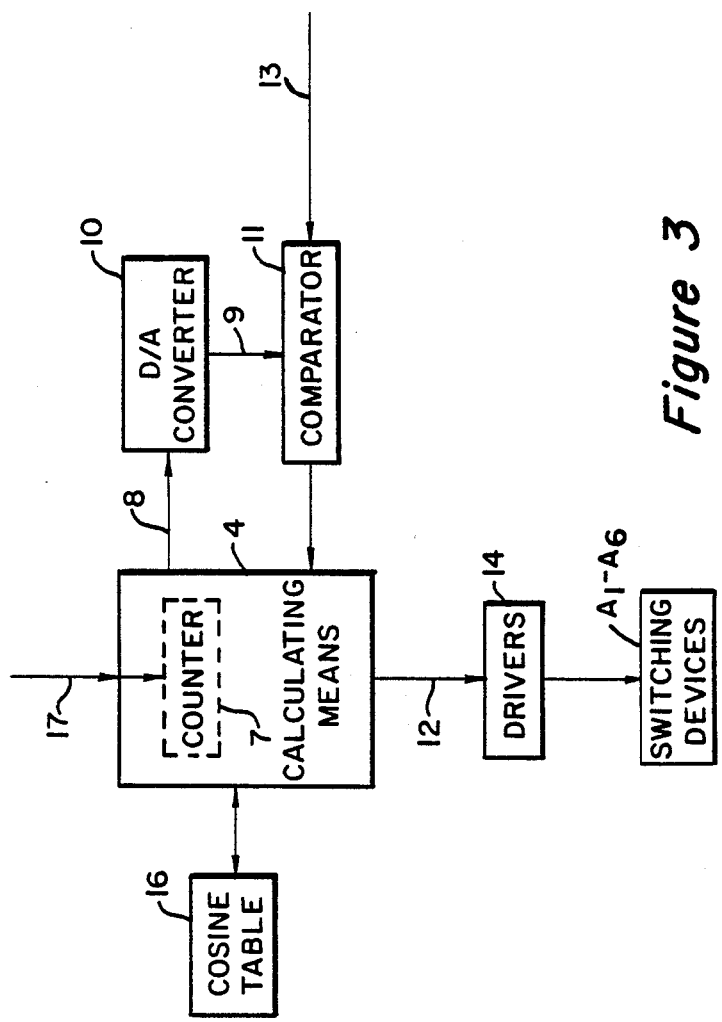
FIG. 3 is a block diagram of a digital gate pulse controller for controlling one bridge circuit in one phase of a cycloconverter.

As shown in FIG. 2, gate pulse generator 1 comprises a controller 2 for each of the six bridge circuits of the cycloconverter shown in FIG. 1 and also an interface circuit means 3. Each bridge controller 2, as shown in FIG. 3, comprises a calculating means 4 such as a microcontroller or a microprocessor. A microcontroller is an integrated circuit which includes a central processing unit, a permanent program and variable data memory, counters, interrupt controllers, and input/output hardware.

Calculating means 4 generates the timing signals using the period of timing pulse 17 derived from one of the input line voltages 25 such as $V_u$. As shown in FIG. 3, the period of timing pulse 17 is measured by calculating means 4 using a counter 7 which counts clock pulses. Calculating means 4 reads the value in counter 7, determines the fraction of time through the latest period of line voltage and looks up the appropriate timing signal value from a predetermined series of values 6, preferably cosine values, which preferably have been stored in a table 16 in memory. The timing signal value is placed on 12 output lines 8 of calculating means 4 which are connected to a D/A converter 10 which converts the digital value to an analog value. This analog value is part of a stepwise approximation to one of the timing signals 9. A comparator 11 determines whether the value of timing signal 9 equals the value of reference signal 13 which represents the desired output. The result of this comparison is read by calculating means 4. If the values are equal, a crossing has been detected and a firing pulse 12 is generated for the appropriate solid state device. Then the position in the predetermined series of values is adjusted and calculating means 4 determines the timing signal for the next solid state device.

To assure the correct firing sequence of the solid state devices, end stop times at the start and end of each timing signal 9 are developed. The solid state devices are not allowed to fire before a certain specified time after the beginning of each timing signal 9. Similarly, the solid state device must fire no later then another certain specified time before the end of each timing signal 9. Preferably these times are stored in the same table 16 as the cosine values and designate those times near the ends of the timing signals 9 by which the solid state devices must or must not be fired.

Figure 4:
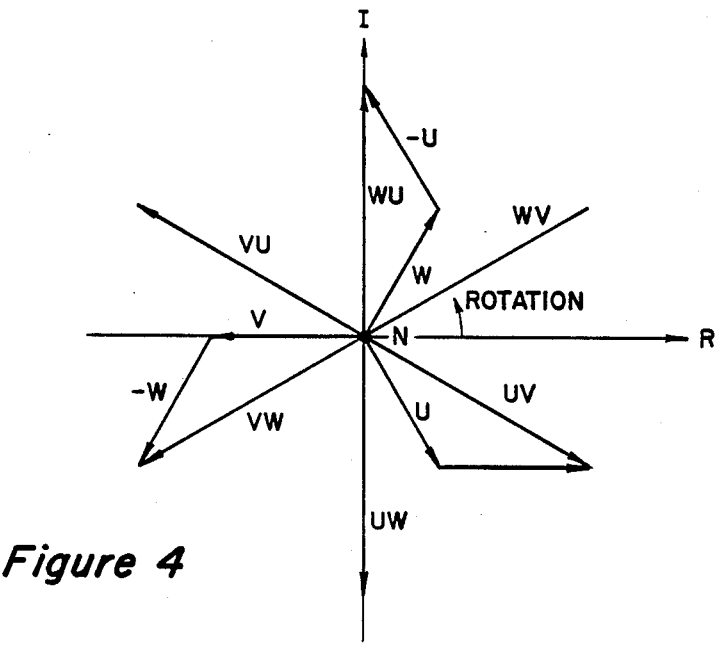
FIG. 4 shows a vector diagram of the input line voltages.
Figure 5A:
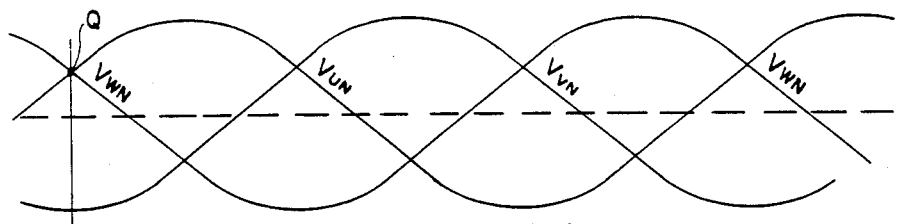
FIGS. 5(a) and 5(b) shows the time sequences of the input line-to-neutral and the line-to-line voltages, respectively.
Figure 5B:
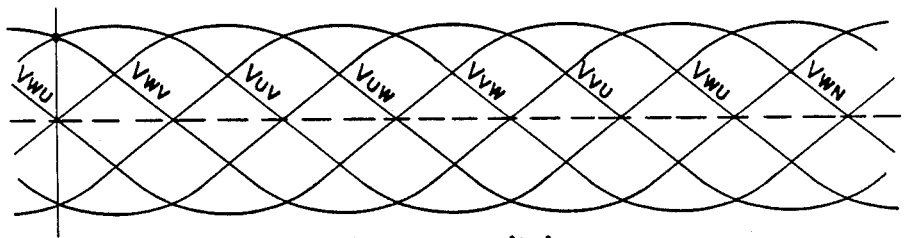

The voltage convention used to explain the operation of one of the gate pulse controllers 2 is shown in FIGS. 4, 5(a) and 5(b). FIG. 4 shows a vector diagram of the input line voltages while FIGS. 5(a) and 5(b) show the timing (but not the actual magnitude) of the input line voltages. The three phases of the input line voltages are labeled U, V, and W, with the phase sequence U-V-W. The line-to-neutral voltages are labeled $V_{UN}$, $V_{VN}$, and $V_{WN}$ while the line-to-line voltages are labeled $V_{UV}$, $V_{UW}$, $V_{VW}$, $V_{VU}$, $V_{WU}$, and $V_{WV}$, where $V_{UV}$ is the voltage from U to V with U positive. In the vector diagram of FIG. 4, the positive real voltage is to the right and the vectors rotate counterclockwise. FIG. 5(a) shows the time sequence of the line-to-neutral voltages and FIG. 5(b) shows the time sequence of the line-to-line voltages.

Figure 6:
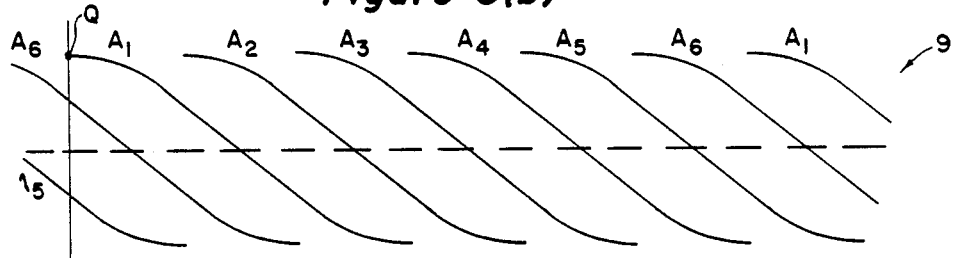
FIG. 6 shows the six timing signals for a positive bridge circuit generated by the calculating means using the predetermined series of reference values.

The cycloconverter of FIG. 1 is controlled by comparing the reference signal for each phase to a series of timing signals 9 and turning on the appropriate switching device when these waveforms correspond. The timing signals for switching devices $A_1$–$A_6$ are shown in FIG. 6. The reference time (or equivalently, the reference phase) for each solid state switching device is defined as the natural commutation point or that time when the switching device would first turn on if it were an ideal diode. For device $A_1$, this is the time when $V_{UN}$ becomes greater than the previous phase, $V_{WN}$ and is shown by point Q in FIG. 5(a). Equivalently, this is when $V_{UV}$ exceeds $V_{WV}$ as shown in FIG. 5(b). This time defines the start of the timing signal of switching device $A_1$. Timing signals 9 have the same frequency as the input line voltages.

Each of the solid state switching devices in a bridge circuit is fired in sequence when a reference signal 13 (the desired output waveform) corresponds to or crosses the timing signal 9 associated with that solid state device. The timing signals are generated from the phase relationship between the phases of the input voltage. As shown in FIG. 6, each timing signal 9 corresponds to a portion of one of the line-to-line voltages phase shifted by 30°. Since there are six timing signals 9, they overlap. However, reference signal 13 is only compared with one timing signal 9 at a time. Reference signal 13 is not compared to the next timing signal until the previous timing signal causes its associated solid state device to fire.

Each of the six timing signals 9 shown in FIG. 6 for switching devices $A_1$–$A_6$ is half a period long (i.e., 180 degrees in duration). The timing signal for each succeeding solid state device is delayed by 1/6 of a period (i.e., 60 degrees) from the preceding timing signal. The timing signals of a negative bridge circuit are the inverse of those shown in FIG. 6. This means that they could be combined into one calculating means if desired.

Figure 7:
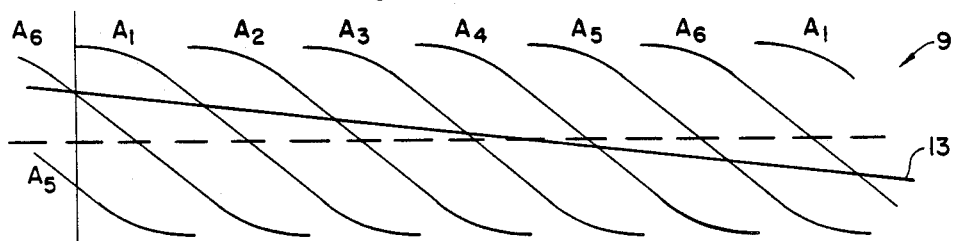
FIG. 7 shows the reference voltage compared to the six timing signals of a positive bridge circuit.
Figure 8:
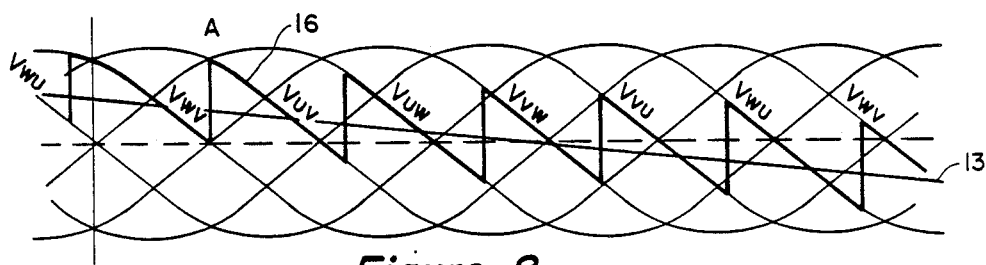
FIG. 8 shows the resulting output voltage for a positive bridge circuit.

FIG. 7 shows timing signals 9 and the particular reference voltage 13 for bridge circuit A Pos. of FIG. 1. FIG. 8 shows the resulting output voltage 16 of bridge circuit A Pos., superimposed on the line-to-line voltages shown in FIG. 5(b).

The solid state switching devices should not be fired before the time when they are forward biased. This is because the device will not turn on when it is back biased. This time should coincide with the start of each timing signal 9; however, since the actual voltage waveforms may not be ideal, a delay is added to assure that the proper firing conditions exist. This delay is called the "Rectification End Stop" and marks the earliest time that a switching device should be fired. The Rectification End Stop is usually set at 30° after the start of each timing wave 9. A side effect of this choice is that the maximum voltage of the output wave is limited to 0.866 times the maximum possible output voltage since cosine 30°=0.866.

At the end of each timing signal 9, the corresponding solid state device must be fired or the next solid state device will not be properly biased. An end stop called the "Inversion End Stop" is imposed before the end of each timing signal 9 to ensure that the corresponding solid state device is fired. This is usually established 30° before the end of each timing signal 9 (i.e., 150° after the start of each timing signal 9).

When a solid state device is fired, it should receive an initial hard pulse. This will provide the necessary current at the proper time to fully turn on the switching device. Following this, the solid state device should stay on until the current flowing therein reverses whereupon it should be turned off. Solid state devices, however, often require one or more succeeding pulses to assure continuing full turn-on. An initial hard pulse followed by a series of shorter pulses which continue until the next solid state device is fired assure continuing full turn-on of the solid state device.

Various strategies have been used to provide the timing of the firing pulse delivered to the solid state devices. One preferred strategy is picket fence generation, although other strategies can be implemented with minor modifications to calculating means 4. At the time of the initial firing of a switching device, a 100 microsecond pulse is generated and sent to the switching device to turn it on. Following this initial pulse, a train of pulses of about 20 microsecond duration is generated with about a 25% duty cycle to keep the solid state device on. These pulses are generated digitally by software in calculating means 4 and therefore the timing can very easily be modified to provide other strategies without requiring any changes to the hardware of calculating means 4.

As shown in FIG. 2, interface circuit means 3 sends and receives signals from the main generator control system (not shown). It also sends and receives signals from each of the six controllers 2 to coordinate their operation. Interface circuit means 3 also provides for initialization and reset when the generator is first started and positive suppression of firing pulses when the gate pulse generator is turned off.

Phase circuit means 15 generates timing pulse 17 preferably in the form of a digital pulse with its falling edge at a known phase with respect to the phase of one of the input voltages 25. Phase circuit means 15 preferably comprises a filter 19 and a comparator 20. Input voltage 25 is filtered by filter 19 which comprises an R-C operational amplifier circuit with a frequency breakpoint of 6 Hz. This introduces a factor of about ten attenuation to 60 Hz inputs so filter 19 also has a gain of about ten to compensate for this. The phase shift of filter 19 is nearly 90 degrees. Because of this, the phase shift is not very sensitive to the values of the R-C components, or the magnitude or the frequency of input voltage 25. The filtered signal is then passed to comparator 20 to detect the zero crossings. Comparator 20 uses a small amount of feedback to reduce the probability of false pulses near the zero crossover. Comparator 20 produces a digital level output that is preferably buffered before being transmitted to digital gate pulse controller 2 where it controls counter 7.

The six bridge controller shown in FIG. 2 are similar and operate in a similar manner. However, the programs in the calculating means, the connections to the reference signals and the output pulses vary from controller to controller due to the different phases of the input and the output. Each controller comprises a calculating means 4, preferably an Intel 8751 microcontroller. This microcontroller has 32 I/O lines of which 26 are used. Several of the lines are used to accept control inputs from interface circuit means 3. Six outputs provide the firing pulses while others are used to output status signals to interface circuit means 3. Twelve lines are used for the bits of the cosine value of timing signal 9 which is output to D/A converter 10.

D/A converter 10, preferably a DAC85 made by Analog Devices, is connected to generate signals between ±10 volts. D/A converter 10 is of high quality to provide an output of satisfactory accuracy without requiring trim or adjustment. The output of D/A converter 10 is sent to comparator 11 to be compared against reference signal 13. The output of comparator 11 is fed back to calculating means 4.

The solid state device firing pulses 12 generated by calculating means 4 are preferably sent to a firing means such as drivers 14 to increase the voltage to 15 volts and to provide 100 ohms source impedance to reduce the effects of noise pickup. Drivers 14 can also receive an inhibit signal from interface circuit means 3 which prevents a solid state switching device from turning on irrespective of the signal from calculating means 4. This feature is especially important in protecting the switching devices from damage due to failures in other parts of the generator control system.

The method of the present invention is implemented using calculating means 4. The basic process is for calculating means 4 to generate the appropriate timing signals and to compare these to the reference signal 13. When a timing signal 9 corresponds to reference signal 13, the appropriate switching device is fired. Calculating means 4 also checks for the end stops which apply limits to the firing times; performs the picket fence generation to keep the solid state devices on; and monitors the external inputs from interface circuit 3 for status signals.

Figure 9:
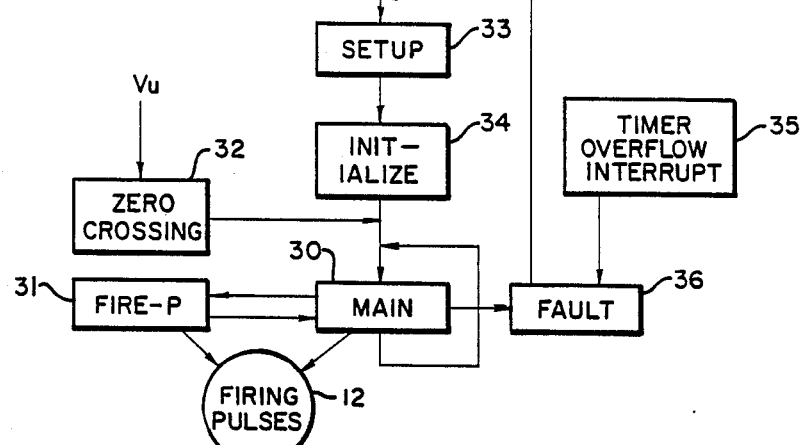
FIG. 9 is a block diagram of various operations implemented by a digital gate pulse controller.

The method of the present invention is implemented by a program which is normally in an endless loop called Main 30 as shown in FIG. 9. However, when a switching device is to be fired, a subroutine called Fire-P 31 is called. This fires the switching device and shifts the attention to the next switching device to be fired. Also, an interrupt routine called Zero Crossing 32 is activated each cycle of the input line voltage. This routine measures the input line voltage period and calculates the number of steps which are to be taken in the predetermined series of values to obtain the next value of timing signal 9.

Additional routines that are not activated during normal operation are: Setup 33, which initializes the reset and zero crossing vectors, calls Initialize 34 and jumps to the program Main 30; and Initialize 34, which initializes the program variables, the I/O lines, the internal hardware in calculating means 4 and verifies the presence of the zero crossing interrupt signal. A Timer Overflow Interrupt 35 is provided to detect loss of the line voltage signal. A Fault routine 36 is provided to respond to problems by turning off the switching devices and identifying the source of the problem.

Figure 10:
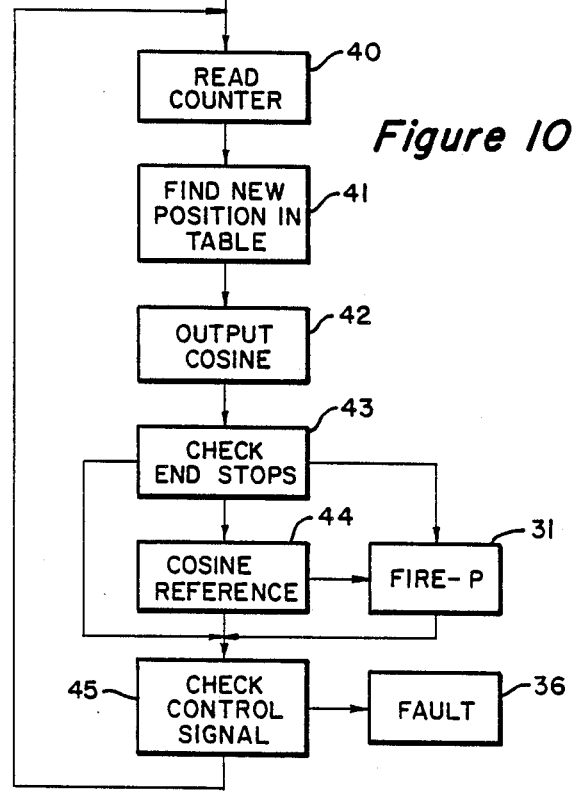
FIG. 10 is a block diagram of the function "Main" implemented by a digital gate pulse controller to determine when to fire a switching device.

FIG. 10 shows the steps implemented by program Main 30. The basic task of Main 30 is to generate the timing signals 9 and to call the routine Fire-P 31 when a timing signal corresponds to the reference signal 13. The first step 40 starts with the reading of the value in counter 7. Since counter 7 preferably counts 1 MHz clock pulses, the value in counter 7 should be about 16,666 counts for a 60 Hz line frequency. Although it can contain more values which would give it more accuracy, the predetermined series of values 6 in cosine table 16 preferably contains 256 values over 180 degrees, or 512 values per cycle of the line voltage. Thus a time which is 1/512th of line frequency counter 7 corresponds to one step in cosine table 16. It is easy to divide the line frequency counter value by 512 on a microcomputer because 512 is an even power of 2; the result, including the remainder, is stored in a variable called nsteps. For each execution of program Main 30, counter 7 is read in step 40.

The position in cosine table 6 is the value in counter 7 divided by the value of nsteps. Since it is very hard to divide on a microcomputer, an accumulator is kept with the product of nsteps times the position in cosine table 16. This product is actually obtained by successive additions of nsteps to the accumulated value. After each addition of nsteps to the accumulated value, the value is compared to the measured time. When the value exceeds the time, the number of steps to be taken in cosine table 16 is known. This process works because the average number of steps to be taken each time through the loop of program Main 30 is only two or three and these few additions can be done very quickly.

With each addition of nsteps to the accumulated value, a position counter is incremented. This counter is used as an offset to obtain the next value of timing signal 9 in step 41. Preferably, the cosine values stored in table 16 have 12 bit accuracy to be compatible with D/A converter 10. The upper 8 bits are stored as a first byte in a first portion of cosine table 16 and the lower four bits are stored as part of a second byte in a second portion of cosine table 16. These bits are applied to the appropriate I/O lines in step 42 to drive D/A converter 10. Two bits of the remaining four bits in the second byte represent the end stops discussed previously which are checked in step 43. A one in either of these bits signifies the presence of a Rectification End Stop or an Inversion End Stop, respectively, at this position in cosine table 16 and the program implements the appropriate response.

The result of the comparison of the analog output of D/A converter 10 with the reference voltage 13 by comparator 11 is read in step 44. The output of comparator 11 is read by a microcontroller input port. If the values correspond, the routine Fire-P 31 is called; otherwise, the program Main 30 then checks the control signals from interface circuit means 3 in step 45. If the signals are normal, program Main 30 returns to the start and begins again, otherwise, it calls Fault routine 36.

It is important to note that the comparison against reference signal 13 is made at the time that the firing decision is being made. This gives a very fast response to changes in reference signal 13. The prior art devices sample the reference signal at the start of a line voltage cycle and precalculate the firing times for the entire cycle. Within each cycle, these devices cannot respond to changes in the reference signal.

While the present invention embodiment preferably converts each digitally generated timing signal 9 to an analog signal for comparison with reference signal 13, the present invention can also be implemented by converting reference signal 13 to digital form by an analog-to-digital converter and reading the value into calculating means 4 in digital form for comparison with timing signals 9. Alternatively reference signal 13 could be generated in digital form by another computer in the control system and transferred directly to calculating means 4.

While a presently preferred embodiment of practicing the invention has been shown and described with particularity in connection with the accompanying drawings, the invention may be otherwise embodied within the scope of the following claims.

What is claimed is:

1. A pulse generator for controlling the firing of a plurality of switching devices of a cycloconverter in response to a reference signal representing a desired output which can vary during a line voltage cycle, each switching device being required to fire in sequence at a specified time which may vary during the line voltage cycle as the reference signal varies, comprising:
   a phase circuit means for generating a timing pulse from an input voltage;
   a series of predetermined values for generating a plurality of timing signals;
   a plurality of gate pulse controllers wherein each controller comprises: a calculating means for using the timing pulse from the phase circuit means to generate a plurality of sequential timing signals by selecting appropriate values for each timing signal from the series of predetermined values; a comparator for comparing each timing signal with the reference signal at a time when a decision to fire each switching device is made; and a firing means to fire each switching device in sequence when the timing signal and the reference signal correspond; and
   an interface circuit means for controlling the plurality of gate pulse controllers.

2. The pulse generator as described in claim 1 wherein the series of predetermined values comprises cosine values.

3. The pulse generator as described in claim 2 wherein the phase circuit means comprises a filter and a second comparator.

4. The pulse generator as described in claim 3 wherein the calculating means only generates one timing signal at a time.

5. The pulse generator as described in claim 2 wherein the calculating means prevents each switching device from firing before a first specified time.

6. The pulse generator as described in claim 5 wherein the calculating means fires each switching device no later than a second specified time.

7. A pulse generator for controlling the firing of a plurality of switching devices of a cycloconverter in response to a reference signal representing a desired output which can vary during a line voltage cycle, each being requried to fire in sequence at a specified time which may vary during the line voltage cycle as the reference signal varies, comprising:
   a phase circuit means for generating a timing pulse from one phase of an input voltage;
   a series of predetermined values for generating a plurality of timing signals;
   a plurality of gate pulse controllers, one for each bridge circuit of the cycloconverter, wherein each controller comprises: a calculating means for using the timing pulse from the phase circuit means to generate a plurality of sequential timing signals by selecting appropriate values for each timing signal from the series of predetermined values; a converting means for converting each timing signal to one which can be compared with the reference signal; a comparator for comparing each converted timing signal with the reference signal at a time when a decision to fire each switching device is made; and a firing means to fire each switching device of the cycloconverter in sequence when the timing signal and the reference signal correspond; and
   an interface circuit means for controlling plurality of gate pulse controllers.

8. The pulse generator as described in claim 7 wherein the series of predetermined values comprises cosine values.

9. The pulse generator as described in claim 8 wherein the phase circuit means comprises a filter and a second comparator.

10. The pulse generator as described in claim 7 wherein the calculating means only generates one timing signal at a time.

11. The pulse generator as described in claim 7 wherein the calculating means prevents each switching device from firing before a first specified time.

12. The pulse generator as described in claim 11 wherein the calculating means fires each switching device no later than a second specified time.

13. A method for generating a plurality of firing pulses for a plurality of switching devices of a cycloconverter in response to a reference signal representing a desired output which can vary during a line voltage cycle, wherein each switching device is required to fire in sequence at a specified time which may vary during the line voltage cycle as the reference signal varies, comprising the steps of:
   generating a timing pulse from an input voltage; using the timing pulse and a series of predetermined values to sequentially generate a plurality of timing signals; and
   comparing each timing signal with the reference signal at a time when a decision to fire each switching device is made to determine the firing time for each switching device.

* * * * *